Feb. 13, 1923.
W. L. GILMORE
FIGHTING AIRPLANE
Filed Apr. 5, 1918
1,445,135
3 sheets-sheet 1
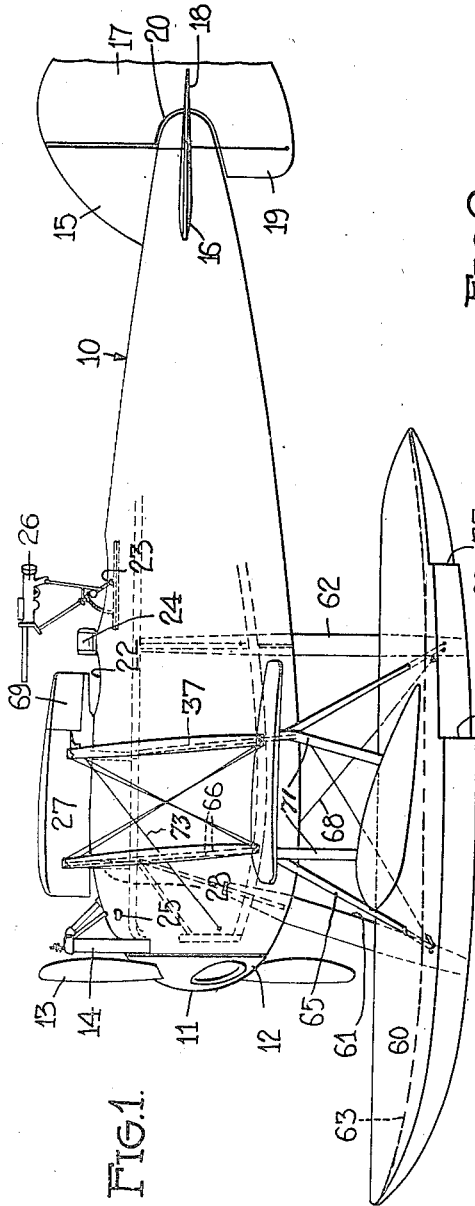
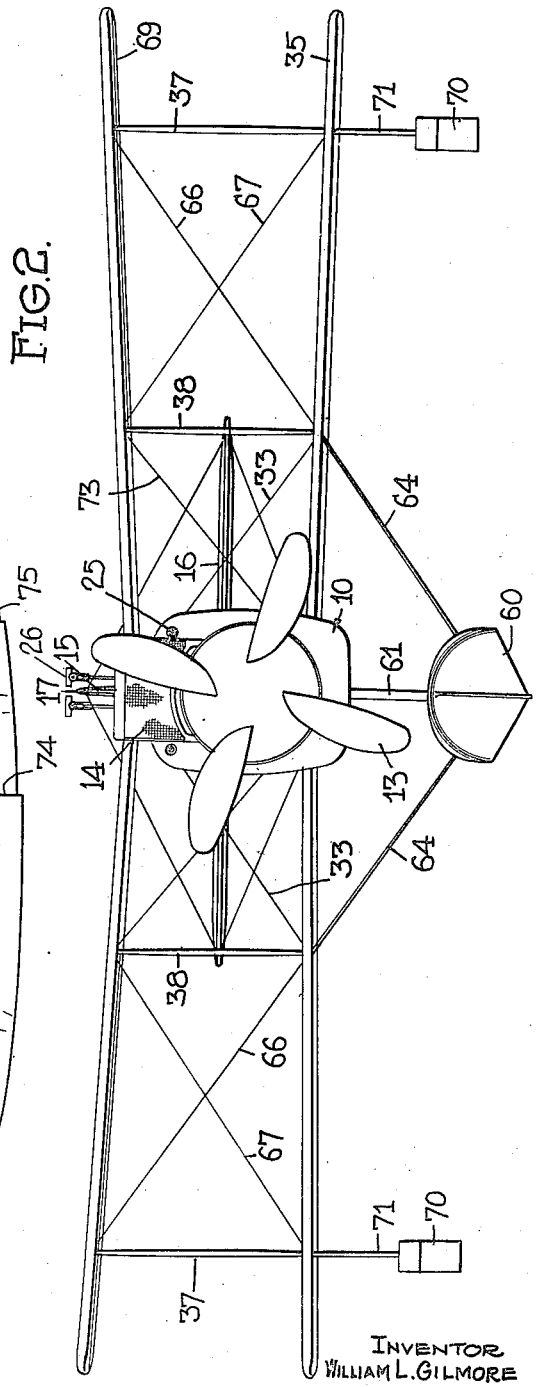
INVENTOR
WILLIAM L. GILMORE
by John P. Zarboy
ATTORNEY Feb. 13, 1923.
W. L. GILMORE
FIGHTING AIRPLANE
Filed Apr. 5, 1918
1,445,135
3 sheets-sheet 2
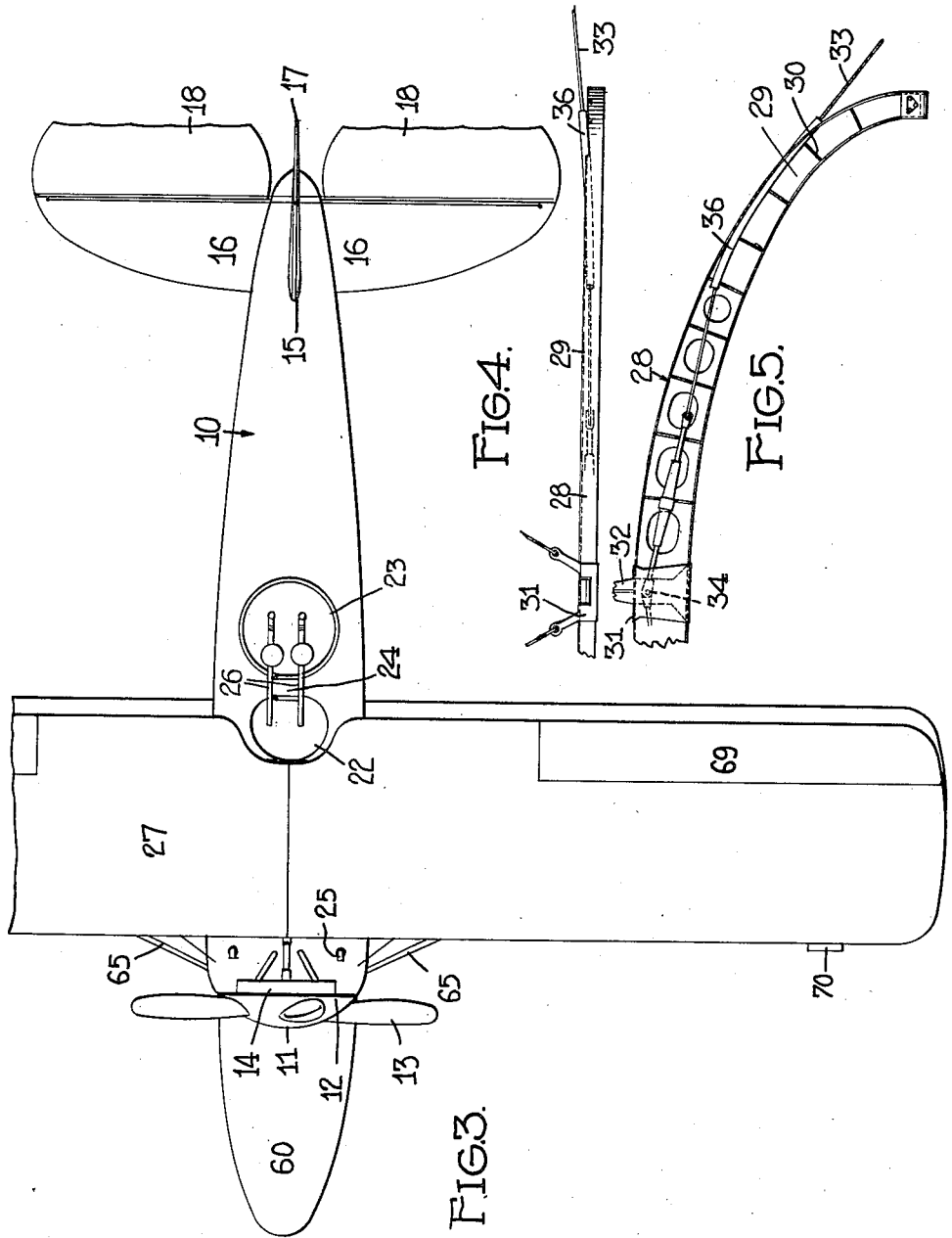

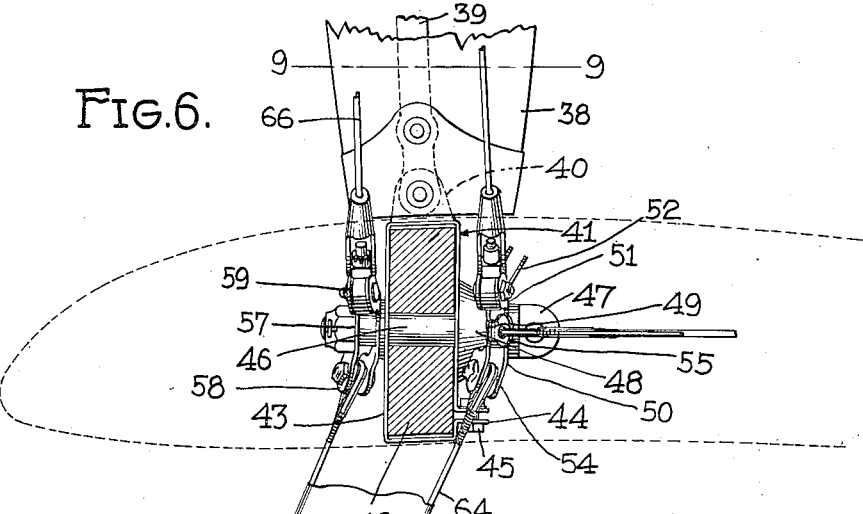
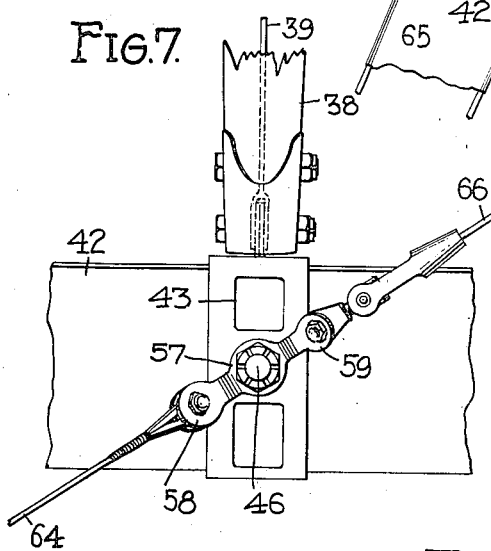
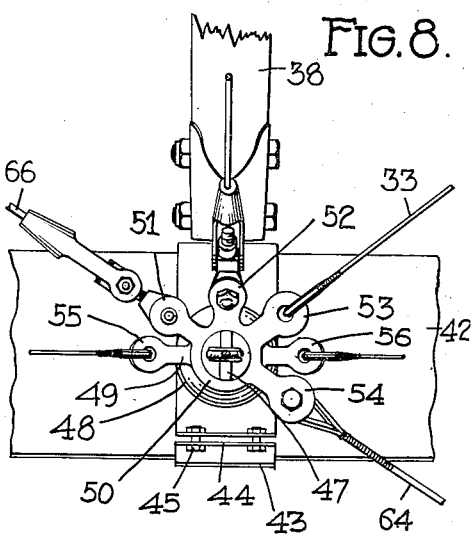
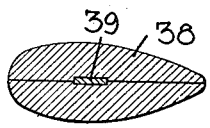

Patented Feb. 13, 1923.

1,445,135

UNITED STATES PATENT OFFICE.

WILLIAM L. GILMORE, OF ROOSEVELT, NEW YORK, ASSIGNOR, BY MESNE ASSIGNMENTS, TO CURTISS AEROPLANE AND MOTOR CORPORATION, OF BUFFALO, NEW YORK, A CORPORATION OF NEW YORK.

FIGHTING AIRPLANE.

Application filed April 5, 1918. Serial No. 226,848.

*To all whom it may concern:*

Be it known that I, WILLIAM L. GILMORE, a citizen of the United States, residing at Roosevelt, in the county of Nassau and State of New York, have invented certain new and useful Improvements in Fighting Airplanes, of which the following is a specification.

My invention relates to fighting airplanes. An aerial battle consists of a number of actions by means of which each combatant endeavors to draw from his material and armament the maximum efficiency possible for the purpose of destroying the enemy power. These actions, which have for their purpose the selection of the most favorable advantage of the hour, of the best position, of the most effective battle formation, etc., constitute the tactical elements of the aerial combat. The performances which result from the inherent qualities of the airplane itself, to wit, from its armament, speed, ease of handling and climbing ability are the technical elements of the battle. Both the tactical and technical elements of the battle constitute factors which, though of two different orders, are yet intimately inter-related.

The battle begins with a series of tactical actions by means of which the assailant endeavors to attack his adversary with all means at his command, i. e., surprise, advantage of great height, group attack, rear attack, etc. It ends by the technical encounter of the two machines involved till one of the planes is either destroyed or put to rout. It is evident therefore that the tactical maneuvering preparatory to the battle can only be executed if the technical characteristics of the plane permit it. For example, the liberty for a machine to engage in battle or avoid it at will implies superiority of speed. Speed, armament, ease of handling and climbing are the principal technical characteristics of superiority which a machine should possess during a battle in order that the many tactical advantages may be brought into play. Speed alone however, with a reasonable factor of safety, is the most important of these considerations and should be developed to the utmost providing the factor of safety is maintained.

The object of the present invention is to combine in a single organization the several technical elements mentioned above and to bring out to the utmost the all important element of speed. With this in view, it is proposed to rearrange and inter-relate the several airplane parts in a manner such that a maximum number of flight resisting surfaces will be eliminated and the parts coordinated in a manner such that not only the speed of the machine will be increased but its climbing efficiency, ease of handling and armament improved. To gain this end the trussing for the wing structure is reorganized and the number of exposed wires reduced. All anchorages for the wiring are located along the neutral axes of the wing beams and the wing posts or wing struts made to function conjointly as both tension and compression elements. In addition to this, the landing gear is stripped to the utmost and its bracing so related to the wing structure that it serves not only as a bracing means for the pontoon (a wheeled base, if a land machine) but as an element of the wing structure trussing as well.

The ease of handling the machine is enhanced not only by the relative arrangement of the empennage units with respect to the body of the craft but by the relative arrangement of the supporting surfaces, landing gear parts, power plant, etc.

The armament consists of four machine guns arranged to be operated two each by the passenger and pilot. These guns have a range of fire in all directions horizontally and a limited range of fire in a vertical plane. Two of the guns are synchronized with the motor to fire thru the propeller while the remaining two are equipped with mountings permitting of their movement into various positions of aim.

Maximum climbing efficiency is brought about by the installation of a high-powered motor weighing somewhat less than two pounds per horse-power together with the installation of a four bladed tractor propeller or screw.

The above characteristics which make for the improved technical qualities of the machine will be set forth more fully hereinafter and definitely established in the claims.

Of the drawings, wherein like characters of reference designate like or corresponding parts.

Fig. 1 is a side elevation of the airplane showing the fuselage construction and relative arrangement of supporting surfaces, empennage, landing gear, etc.

Fig. 2 is a front end elevation.

Fig. 3 is a plan view (partly broken away).

Fig. 4 is a detail top plan view of the arch or bridge support for the upper supporting surface.

Fig. 5 is a side elevation of the bridge support.

Fig. 6 is a detail view of one of the wing fittings showing the cable connections and the manner in which the wing posts and cables are fastened to the wings.

Fig. 7 is a front end elevation of that portion of the wing fitting and its related parts illustrated in Fig. 6.

Fig. 8 is a view similar to Fig. 7 showing the reverse side of the wing fitting in elevation, and Fig. 9 is a section on the line 9—9 of Fig. 6.

The expression "neutral axis" is used herein to designate the axis of a beam, strut, spar or other structure at which both the tension and compression stresses are equilibrated. The central longitudinal axis is therefore not necessarily the neutral axis.

The airplane, although illustrated as of the hydro-aeroplane type, is characterized by many features of novelty which can equally as well be used in connection with land machines. These novel features include an improved construction of fuselage, an improved wing structure trussing, an improved empennage arrangement, etc. It is to be borne in mind therefore that the claims are intended to cover and do cover, where the terminology permits, any and all types of heavier than air machines designed to be supported in the air by its reaction upon suitable supporting surfaces or wings.

The fuselage 10, both in side elevation and plan (see Figs. 1 and 3) is of substantially true streamline form. Its nose end is relatively blunt and rounded as at 11 to give it a streamline entry. A cap 12 for the propeller 13 is used for this purpose. The motor (not shown) weighs two pounds per horse-power or less and is of the multi-cylinder type developing 350 horse-power at least. Like the propeller 13 the motor is mounted at the forward end of the fuselage, although unlike the propeller it is completely enclosed. This location of the motor and propeller in such close proximity is advantageous in that the latter may be directly driven from the motor at a speed calculated to give maximum efficiency. The propeller is preferably of the four-bladed type.

Directly behind the propeller 13 a radiator 14 is mounted so that the slip stream of the propeller will act directly upon it. The shape of the radiator is best illustrated in Fig. 2 where it is shown as of substantially rectangular form. Its width is somewhat less than the width of the fuselage for a reason later to be disclosed and its height should be restricted within certain limits so that it will not extend materially above the horizontal plane of the upper supporting surface at the point where the wings abut. The location of the radiator in this position eliminates all possibility of inefficient cooling and at the same time causes it to interfere in no way with the range of vision of the pilot or with the firing of the machine guns with which the machine is equipped.

The fuselage at its rear is provided with the usual stabilizing and directional control surfaces which constitute the empennage. The vertical stabilizer 15 and the horizontal stabilizer 16 are of the double cambered type. Both have their trailing edges located in advance of the rear end of the fuselage. The rudder 17 and elevator flaps 18 which constitute the directional control surfaces (as is the usual practice) are mounted in direct continuation of the stabilizing surfaces 15 and 16. The leading edges of these surfaces are therefore in advance of the extreme rear end of the fuselage. In other words the axes of the directional control surfaces bisect the fuselage forwardly of its extreme rear end. The control elements for these surfaces may be accordingly completely enclosed with a resulting elimination of a number of flight resisting surfaces heretofore almost invariably exposed. To permit of this arrangement and still provide a rudder overhang, which is desirable, the rudder, at one end, may be extended forwardly beyond its axis of oscillation as indicated at 19 in Fig. 1. Furthermore, the rudder 17 is notched or recessed as at 20 to accommodate that portion of the fuselage extended to the rear of the axes about which both the rudder 17 and elevators 18 move. Wiring 21 may be used, if desired, to brace the empennage elements. This bracing is advisable in view of the high aspect ratio of the horizontal stabilizer and the high speed for which the machine is designed.

Cockpits 22 and 23 are provided in the fuselage to accommodate respectively the pilot and gunner. Between the cowling of the cockpits a head rest 24 which may be used by the occupant of either cockpit, is disposed. The defensive armament of the machine consists of four machine guns arranged to be operated two each by both the pilot and gunner. The machine guns 25 under the control of the pilot are fixed and located symmetrically (within the fuselage) at opposite sides of the fore and aft axis of the machine. At their extreme forward end these guns project thru the fuselage (see Fig. 3) to fire directly ahead and thru the field of the propeller. To prevent mutilation of the propeller blades during the firing of these guns a synchronizing device is connected up with the motor. The two remaining guns 26 have a range of fire in a horizontal plane throughout the full sweep of 360° although their range of fire in a vertical plane is somewhat limited. These guns are under the control of the gunner and are provided with mountings which permit of their accurate aim in all directions. The accommodations for the gunner are of such character and construction that he is permitted to turn completely around.

Forwardly of the cockpits 22 and 23 and in the plane of the top of the fuselage 10 a supporting surface 27 is provided. This supporting surface (in the embodiment of the invention selected for illustration) is the upper supporting surface of a biplane. If the machine is of the triplane or multiplane type the supporting surface having this location will be either the or one of the intermediate surfaces. In either event it comprises preferably opposed wing sections of equal span. These wing sections extend outwardly from the fuselage in a manner making a slight positive dihedral angle when viewed from the front. They are attached to the fuselage by two arches or bridge supports 28 of a span equal to the width of the fuselage. Each arch (see Figs. 4 and 5) comprises a longitudinally curved channel beam 29 having reenforcing flanges 30 provided at intervals throughout its length. Intermediately they are equipped with fittings 31 of a construction designed to embrace the arches and extend above them to provide ears 32 through which the hinge pins of the opposed wing sections extend. The arches or bridge supports are strengthened longitudinally by cables 33 fastened to them as at 34 at or near their points of attachment with the wings. These cables extend right and left from the points 34 downwardly at an angle determined by the curvature of the arches and thence downwardly more abruptly and without the fuselage for connection with the beams of the lower supporting surface designated as 35. The manner and place of attachment of these cables 33 with the lower supporting surface will be hereinafter more fully set forth. Although curved or bent intermediate their ends the cables are continuous throughout their respective lengths. In this connection cable tubes or wrappings 36 are used. The tubes not only prevent contact between the bridge supports and cables but they permit of slight longitudinal movement of the cables when necessary in tightening them or when subjected to undue strain.

The lower supporting surface 35 also comprises opposed wing sections of equal span. These wings or sections make a slight negative dihedral angle. Their negative angularity is less than the positive angularity of the wings of the upper supporting surface as it is desired that the resultant of the two will present in front elevation a wing structure having a slight positive dihedral angle in view of the inherent lateral stability obtained. In addition, by extending the wings of the superposed supporting surfaces at opposite angles a gradually widening gap is provided between them. This too is beneficial in that the gap between the wings at or near their tips is made larger and equal to the chord of the wings.

The supporting surfaces or wings are trussed longitudinally by an improved arrangement of wires or cables whereby the principal lift load is carried to the fuselage by way of the landing gear. Front and rear wing posts 37 and front and rear wing posts 38 interconnect the supporting surfaces at predetermined stations throughout their length. The wing posts 38 are of a construction such that both compression and tension strains are carried by them. In Figs. 6 and 9 it will be noted that these wing posts 38 are longitudinally divided and grooved to receive and completely enclose metal straps 39. The length of these straps is such that they extend throughout the full length of the wing posts for connection at its ends, with ears 40 formed upon fittings 41 of a construction designed to embrace the wing beams 42 of the wings against which the wing posts 38 are fitted. Each fitting 41 comprises but a single strip of metal lightened as at 43, bent around the wing beam, and terminally flanged as at 44 so that it may be clamped as at 45 to the beam. Its principal fastening and the fastening means which prevents its longitudinal displacement (referring still to the fitting) is that fastening derived through the use of a bolt 46 which penetrates the beam along its neutral axis, i. e., that point which may best be penetrated without weakening the beam in the least. The inner end of the bolt 46 is provided with an eyehead 47 to which is attached one of the compression members (not shown) of the wing. Attaching plates 49 and 50 are interposed between the head 47 and blocking 48 carried by the bolt upon the inner side of the wing beam. These attaching plates are held in place by the bolt 46 and provide anchorages for the many wires or cables which concentrate at this point. The anchorages in each instance are formed by ears which radiate from the attaching plates in the direction of the wires or cables which they anchor. The attaching plate 50 is provided with ears 51, 52, 53 and 54 and the attaching plate 49 with ears 55 and 56. The ears 51 and 53 provide anchorages for the lift and drop wires respectively of the wing structure, the ears 52 provide anchorages for the stagger wires, the ears 54 provide anchorages for the lift wires which connect with the landing gear and the ears 55 and 56 provide anchorages for the drift wires of the wing. Upon the outside of the wing beam or its forward side an attaching plate 57 is provided. This plate is also equipped with ears 58 and 59 which serve as anchorages for the landing gear lift wires and the lift wires of the wing structure respectively. The ears 58 and 59 are directly opposed to the ears 51 and 54 of the attaching plate 50 and with these ears provide for the anchorage of dual wiring later to be disclosed.

In the hydroaeroplane embodiment of the invention a single center pontoon or float 60 is used. It is mounted directly beneath the fuselage or body 10 and spaced from it by single centre landing struts 61 and 62. These struts extend into the fuselage, i. e., through it and are in this way made an intimate part of it. They likewise extend beyond the deck of the pontoon for connection with its keelson 63 to constitute an intimate part of the pontoon as well. The landing gear lift wires which connect with the anchorages 54 and 58 also extend through the deck of the pontoon for connection with the keelson at the foot of the struts 61 and 62. These wires, designated 64, extend divergently upwardly, viewed from the front of the machine, from the center line of the keelson to the anchorages above mentioned at the foot of the wing posts 38. While the machine is in the air they take up the greater portion of the lift load and transmit it by way of the struts 61 and 62 into the fuselage and over an extended area thereof. The landing gear lift wires which are in duplicate are streamlined as a unit and as indicated at 65 in Fig. 6.

The landing gear lift wires 64 are continued beyond the lower supporting surface, although at an angle, upwardly and outwardly by lift wires 66 also in duplicate, which are fastened at their upper outer ends to the upper supporting surface and to the neutral axis of the wing beams thereof by fittings similar to the fitting 41. These last mentioned fittings accommodate the upper ends of the wing posts 37. These wires are also streamlined as a unit to minimize resistance in flight. In addition to the lift wires 66 drop wires 67 are provided and cross arranged with respect to the lift wires 66 to take up landing strains. Their arrangement and fastening is more or less conventional.

It will be noted that the usual lift wires provided intermediate the fuselage and the wing posts 38 have been eliminated and the resistance to flight proportionately reduced. This elimination of these heretofore essential wires or cables is made possible by the wing post construction described above. The straps 39 carry the lift load of the upper wings to the fittings at the foot of the struts 38 where it is carried by the wires 64 to the landing gear.

When viewed from the side the landing gear wires 64 converge upwardly from the foot of the struts 61 and 62 (inside the pontoon) to the foot of the front and rear wing posts 38. These wires transversely brace the landing gear and tend to transmit the landing strains throughout the wing structure. The pontoon is further braced by the cross arranged cables 68 which are terminally anchored at the foot of the struts 61 and 62 and at points inside the fuselage. By carrying these cables into the pontoon the deck of the pontoon is relieved of compression strains as is also the bottom covering of the fuselage. The keelson 63 which is strong takes up the compression strains instead. For the purpose of laterally stabilizing the machine ailerons 69 are provided. The means for effecting lateral stability while the craft is hydroplaning consists of end wing floats 70 in the form of pontoons. These floats like the center main pontoon 60 are supported by single center struts 71. Their mounting however is stripped of wiring.

The wires 73, which appear to be lift wires in Fig. 2, are drift or nose wires. They extend outwardly and upwardly from the nose end of the fuselage (see Fig. 1) to the upper supporting surface at or near the points of attachment of the front wing posts 38. The wires 33, which also appear in Fig. 2, constitute with the landing gear lift wires 64 an exceptionally strong type of truss. This truss transmits the lift load to the supporting surfaces, by way of the pontoon into the fuselage, it transfers the landing load from a point at the center of the bridge support 28 to points adjacent its end and it concentrates the various stresses at that section of the fuselage best capable of withstanding them. The landing gear struts 61, the wing beams of the lower supporting surface from the wing posts 38 inwardly, and the vertical fuselage struts themselves (not shown) directly function in this connection. The lift wiring for the supporting surfaces may be described as extending upwardly and outwardly from the landing gear to the lower supporting surface and thence divergently upwardly to the upper supporting surface, the branch extensions of this trussing consisting of the tie straps 39 enclosed in wing posts 38 and the lift wires 66. In other words, this arrangement of trussing strengthens the upper supporting surface of the wing structure as a whole at two points rather than one. The low aspect ratio of the fuselage is advantageous in that its depth is sufficient to extend from the upper to the lower supporting surface and at the same time so elevate the occupants of the machine that their range of vision extends forwardly above the upper supporting surface where no obstructions are encountered. Moreover, all anchorages for the various wires are completely enclosed and accordingly removed from the line of air rush while the machine is in flight.

While the pontoon 60 is shown as provided with two steps 74 and 75, such a construction is only preferred. By providing two steps the machine takes to the air easier and the skin friction and suction of the water, when hydroplaning, is reduced. The pontoon however should be given a good streamline form, and for best service should have its bottom surface constructed along the well known V-type lines. Throughout it should be lightened as much as possible without undue reduction in strength.

A machine constructed as above set forth will develop approximately one hundred and fifty (150) miles per hour. The installation of a high-powered motor and a four-bladed tractor propeller enhances the climbing ability markedly. Its ease of handling is bettered by the streamline form given all exposed elements together with the novel arrangement of the empennage parts as disclosed. Practically all defensive armament is concentrated at or near the engine section of the fuselage so as to lie directly over one of the landing gear struts. This is desirable in view of the reduction of size possible and adequate strength assured. All of such features enter into the technical improvements upon the machine, i. e. the improvements most essential to a fighting machine.

While I have described my invention in detail in its present preferred embodiment, it will be obvious to those skilled in the art after understanding my invention, that various changes and modifications may be made therein without departing from the spirit or scope thereof. I aim in the appended claims to cover all such modifications and changes.

What is claimed is:

1. In an airplane, a wing including a wing beam, a wing strut, a fitting carried by the wing beam, an anchorage formed upon the fitting and enclosed for the major part within the confines of the wing strut, and a tension member fastened to the anchorage.

2. In an airplane, a wing including a wing beam, a wing strut, a fitting carried by the wing beam, an anchorage formed upon the fitting and extended into the wing strut, and a tension member enclosed in the wing strut and fastened to the anchorage.

3. In an airplane, superposed wings, a wing strut extending from one to the other of the wings, fittings at the ends of the wing strut, anchorages formed upon the fittings and extended into the strut ends and a tension member enclosed in the wing strut and fastened to the anchorages.

4. In an airplane, superposed wings, each wing including a wing beam and an outer wing covering, brace wires extending from one to the other of the beams of the superposed wings, and anchorages for the brace wires carried by the wing beams and enclosed for the major part within the confines of the wing covering.

5. In an airplane, superposed wings, each wing including a structural framework and an outer wing covering, brace wires extending from one to the other of the wings, and anchorages for the brace wires fastened to elements of the structural framework, said anchorages being enclosed within the confines of the wing covering.

6. In an airplane, superposed wings, each wing including a wing beam and an outer wing covering, brace wires extending from one to the other of the beams of the superposed wings, and anchorages for the brace wires extended through and enclosed for the major part within the confines of the wing coverings.

7. In an airplane, superposed wings, each wing including a pair of wing beams, an internal brace wire and an outer covering, brace wires extending from one to the other of the wings, and anchorages for both the inter-wing brace wires and the internal brace wires carried by the wing beam and enclosed within the confines of the wing covering.

8. In an airplane, superposed wings, a wing strut fastened to and extended from one to the other of the wings, fittings carried by the wings at the ends of the wing strut, and a tension member enclosed in the wing strut and connected at its ends with the fittings.

9. In an airplane, a wing, a wing beam incorporated in the wing as a structural element thereof, a fitting, said fitting comprising a body portion adapted to embrace the wing beam, a bolt extended thru the wing beam and thru the body portion of the fitting, the arrangement of the bolt being such that it passes thru the wing beam at a point along its neutral axis, wiring for the wing, and anchorages for the wiring carried by the bolt.

10. In an airplane, a wing, a wing beam incorporated in the wing as a structural element thereof, a fitting, said fitting comprising a body portion, a bolt extended thru the wing beam and thru the body portion of the fitting, the arrangement of the bolt being such that it passes thru the wing beam at a point along its neutral axis, wiring for the wing structure, and anchorages for the wiring carried by the bolt at opposite sides of the wing beam, said anchorages being enclosed for the major part within the confines of the wing.

11. In an airplane, a wing, covering for the wing, a wing beam incorporated in the wing as a structural element thereof, a fitting, said fitting comprising a body portion, a bolt extended thru the wing beam and thru the body portion of the fitting, the arrangement of the bolt being such that it passes thru the wing beam at a point along its neutral axis, wiring for the wing structure, anchorages for the wiring carried by the bolt and enclosed for the major part within the confines of the wing covering, a wing strut, a tension member enclosed in the wing strut, and an anchorage for the tension member hidden within the confines of the wing strut.

12. In an airplane, a fuselage, superposed wings extended laterally out from the fuselage, wing struts extended from one to the other of the superposed wings, a tension member extended from one to the other of the superposed wings and enclosed for the major part within the confines of one of the wing struts, and a second tension member extended from one to the other of the superposed wings, said last mentioned tension member being extended at an angle to the first mentioned tension member tho connected at one end to one of the wings at a common point with the connection between the other of said tension members and said wing.

13. In an airplane, a fuselage, a landing gear mounted beneath the fuselage, superposed wings extended laterally out from the fuselage, a wing strut extended from one to the other of the wings, a tension member extending from one to the other of the wings and enclosed within the wing strut, a brace wire extended from one to the other of the wings and connecting with the lowermost wing adjacent the foot of the wing strut, and a continuing brace wire between the lowermost wing and the landing gear, said last mentioned wire being likewise connected at one end adjacent the foot of said strut.

14. In an airplane, a fuselage, a landing gear mounted beneath the fuselage, superposed wings extended laterally out from the fuselage, wing struts extending from one to the other of the wings, tension members enclosed in the wing struts next adjacent the fuselage, brace wires extended upwardly at an angle from the foot of said last mentioned struts, anchorages for both the tension members and the brace wires carried by the superposed wings, and brace wires extending between the landing gear and the lowermost wings, said last mentioned brace wires having anchorages at one end common with the wires and tension members first mentioned.

15. In an airplane, a body including a skeleton framework and an outer covering within which the framework is enclosed, wings extended laterally out from the body intermediately of its ends, and a support for the wing arched across and enclosed within the outer covering of the body.

16. In an airplane, a body including a skeleton framework and an outer covering within which the frame-work is enclosed, wings extended laterally out from the body intermediately of its ends, a support for the wings arched across and enclosed within the outer covering of the body, and a wing hinge member carried by the support and extended without the covering.

17. In an airplane, a body including a skeleton framework and an outer covering within which the framework is enclosed, wings extended laterally out from the body intermediately of its ends and a combined fuselage strut and support for the airplane wings arched across and enclosed within the outer covering of the body.

18. In an airplane, a body including a skeleton framework and an outer covering within which the framework is enclosed, superposed wings extended laterally out from the body intermediately of its ends, a support for the wings extended across and enclosed within the outer covering of the body, a wing hinge member carried by the support for the anchorage of the upper wings and brace wires extending off laterally from the anchorage to the lower wings.

19. In an airplane, a body including a skeleton framework and an outer covering within which the framework is enclosed, superposed wings extended laterally out from the body intermediately of its ends, a support for the wings extended across and enclosed within the outer covering of the body, an anchorage for the wings carried by the support, brace wires extended laterally out from the anchorage to the lower wings and brace wires extended between the lower wings and the landing gear, said last mentioned brace wires having anchorages at the lower ends of the first mentioned brace wires.

20. In an airplane, a fuselage, wings extended laterally out from the fuselage, a support for the wings extended across the fuselage for the attachment of the wings, and a brace for the support connecting at one end at the point of attachment of the wings.

In testimony whereof I hereunto affix my signature.

WILLIAM L. GILMORE.